United States Patent
Faden et al.

(10) Patent No.: US 6,647,841 B2
(45) Date of Patent: Nov. 18, 2003

(54) DEVICE FOR THE END FACE DRIVING OF TOOTHED WORKPIECES

(75) Inventors: Josef Faden, Dubendorf (CH); Giorgio Scacchi, Hinwil (CH)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 09/991,908

(22) Filed: Nov. 26, 2001

(65) Prior Publication Data

US 2002/0062721 A1 May 30, 2002

(30) Foreign Application Priority Data

Nov. 28, 2000 (DE) .......................... 100 59 116

(51) Int. Cl.⁷ .......................... B23B 33/00; B23B 31/16
(52) U.S. Cl. .......................... 82/150; 82/165; 279/123
(58) Field of Search .................. 82/150, 165; 279/123; 142/53

(56) References Cited

U.S. PATENT DOCUMENTS

| | | | | |
|---|---|---|---|---|
| 1,361,120 A | * | 12/1920 | Weatherby | 82/165 |
| 2,793,136 A | * | 5/1957 | Root | 428/147 |
| 4,215,605 A | * | 8/1980 | Toth et al. | 82/165 |
| 4,370,907 A | * | 2/1983 | Felice | 82/150 |
| 4,677,885 A | * | 7/1987 | Schmid et al. | 82/165 |
| 4,778,730 A | * | 10/1988 | Zucker | 728/552 |
| 5,243,885 A | * | 9/1993 | Lash | 82/165 |
| 5,340,128 A | * | 8/1994 | Weiss et al. | 279/60 |
| 5,493,939 A | * | 2/1996 | Bornhorst, Jr. | 82/150 |
| 6,350,181 B1 | * | 2/2002 | Wirz | 451/47 |
| 6,374,713 B1 | * | 4/2002 | Bissett | 82/150 |
| 2002/0062721 A1 | * | 5/2002 | Faden et al. | 82/150 |
| 2002/0070508 A1 | * | 6/2002 | Maerzhaeuser et al. | 279/60 |

FOREIGN PATENT DOCUMENTS

| | | |
|---|---|---|
| DE | 33 38 562 A1 | 8/1985 |
| DE | 41 08 760 A1 | 11/1991 |

* cited by examiner

*Primary Examiner*—A. L. Wellington
*Assistant Examiner*—Brian D. Walsh
(74) *Attorney, Agent, or Firm*—Browdy and Neimark, P.L.L.C.

(57) ABSTRACT

The device serves for the end face, angularly true driving of a pre-toothed workpiece (21) clamped between work centers by the rotating work spindle (3) of a tooth flank grinding machine. It takes place by means of a wobble plate (10) connected without play to the work spindle by way of the work arbor (1), the intermediate disc (17) and the cylindrical steel rollers (13, 18), the surface of which said wobble plate which contacts the workpiece end face (29) being according to the invention coated with galvanically bonded hard material grains (24).

8 Claims, 3 Drawing Sheets

DEVICE FOR THE END FACE DRIVING OF TOOTHED WORKPIECES

FIELD OF THE INVENTION

The invention concerns the end face, non-clearance, rotationally rigid connection between the work spindle of a machine tool and the shaft-like workpiece set up between centers on it for machining, especially for tooth grinding.

BACKGROUND OF THE INVENTION

An end face torque transmission from the work spindle to the workpiece is required in the case of workpieces where the use of a chuck is impossible because, for example, they must be machined on their periphery over their entire length, or because a clamping medium acting on the periphery would collide with the machining tool. This applies chiefly to lathes, circular grinders, but also to gear tooth grinding machines. In the latter case the reason for the need for an end face work driver can additionally derive from the workpiece not being provided with a point suitable for peripheral clamping.

In the applications of face work drivers dealt with here, in contrast to common external and internal chucks, the functions of the centering and supporting of the workpiece against axial and radial machining forces are completely separated from that of the torque transmission, or absorption of the tangential machining forces. The centering and the axial and radial workpiece accommodation are effected by means of pointed work centers on the work spindle and tailstock barrel, and the center bores in the end faces of the workpiece. The non-clearance connection between the work centers and the workpiece center bores is so designed and axially pre-tensioned that the workpiece is held reliably and with high accuracy against the radial and axial machining forces. The function of the face work driver is to transmit the rotation of the work spindle angularly true to the workpiece via the workpiece end face, such that the rotational connection withstands the machining torque reliably, and the function of the centers is not disturbed, especially with respect to locational accuracy. It is easy to appreciate that the angular accuracy of the drive is of extremely great importance in gear tooth grinding, as the tooth flanks must be ground to micrometric precision.

The well known and for most applications established technique of face driving is based on a ring of axially protruding knives of carbide or hardened steel, which bite axially into the softer end face of the workpiece as the workpiece is clamped, and via the thus formed indentations produce a positive connection between the work spindle and the workpiece. In order that in the case of unevenness and axially untrue running of the workpiece end face all knives embed themselves in the workpiece end face and the workpiece is not subjected to axially eccentric loading, the knives are axially movably located in the work spindle, and bear on springs, on a wobble plate or on the fluid of a transmission system. The axial force exerted on the workpiece is divided between the work center and the ring of knives. In order to assure that the proportion on the work center is adequate to fulfill its function, either the work center or the ring of knives must be spring-loaded.

A very advantageous property of this solution in many applications is the transmission of high torques. On account of the geometry of the knives and the constant axial pretensioning, the knives bite deeper into the workpiece end face with increasing torque, whereby the resistance to any slip increases. This process is of course accompanied by a slight rotation of the workpiece relative to the work spindle, which is of no disadvantage in most cases of application. It makes this solution unsuitable for tooth flank grinding, however, because here any rotation between the work spindle and the workpiece in the grinding cycle under load results in an unacceptable geometrical tooth flank error.

Moreover conventional face work drivers operate flawlessly with non-hardened workpiece surfaces. On the other hand the penetration of the knives into a hardened workpiece end face is inadequate, and the knife wear increases to an intolerable extent.

SUMMARY OF THE INVENTION

It is therefore an object of the invention to introduce a device for the end face driving of a workpiece, which allows the avoidance of these disadvantages, yet permits the driving torques incurred in tooth flank grinding to be transmitted reliably. The object is attained by way of the features described in the independent claim.

BRIEF DESCRIPTION OF THE DRAWING

The invention is described in detail via the example of the set-up of pre-machined toothed workpiece on a tooth flank grinding machine, referring to the drawings. These depict.

DETAILED OF A PREFERRED EMBODIMENT

Figure 1:
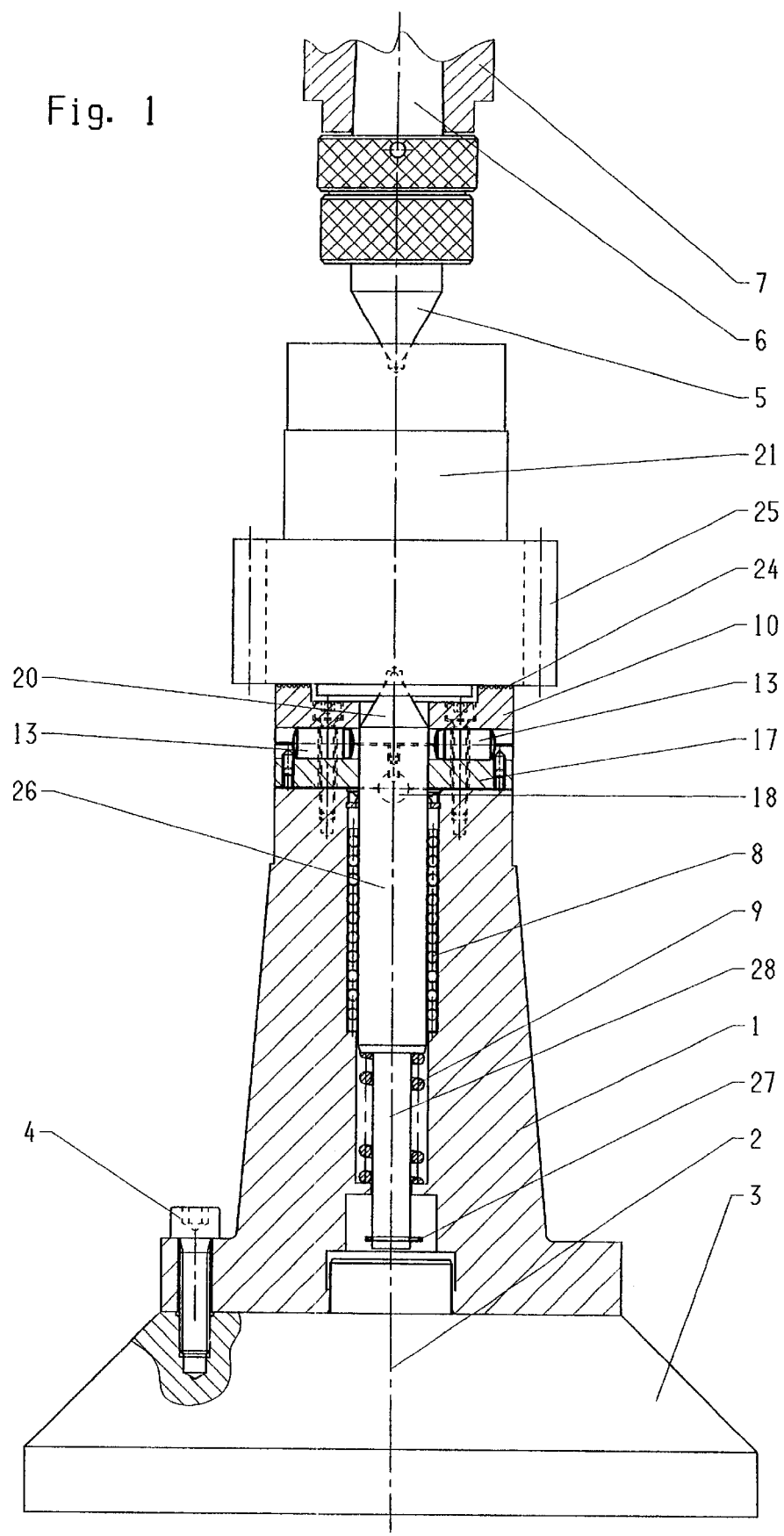
FIG. 1 the axial section through the work fixture with clamped workpiece.

The work fixture according to the invention comprises a work arbor 1, which is attached rigidly by means of the flange bolts 4 to the work spindle 3 rotating about its axis 2, and the work center 5, located for rotation about the axis 2, which is accommodated centrally via its tapered shank 6 in the axially movable tailstock barrel 7. Located inside the work arbor 1, concentric with the axis of rotation 2 and by means of the ball sleeve 8 axially displaceable without play on its cylindrical shaft 26, is another work center 20, which bears against the work arbor 1 by way of the spring 9. In the direction of the barrel 7, the axial stroke of the work center 20 is limited by an axial stop of arbitrary design at the lower end of the shaft 28, here in the form of a circlip 27.

At the head of the work arbor 1, the wobble plate 1 is pivot seated about the axis 14 at right angles to the axis 2 via the inner wall of the slightly more than half-removed bore 12 on its lower face on the cylindrical steel rollers 13. The cylindrical steel rollers 13 seat in the inner wall 15 of the upper half-removed bore 16 of the intermediate disc 17, which is in turn seated in similar fashion to the wobble plate 10 via the steel rollers 18 on the upper end of the work arbor 1, the pivot axis 19 of the intermediate disc 17 being offset through 90° relative to the pivot axis 14 of the wobble plate 10 in the plane at right angles to the axis 2. The upper face of the wobble plate 10 is according to the invention coated with hard material grains 24 of diamond, for example, or CBN.

Centered via the work centers 5, 20 of the barrel 7 and work arbor 1 respectively, and pressed via the axial barrel thrust against the hard grain coated wobble plate 10, the workpiece 21 to be ground which has a pre-toothed periphery 25 is connected torsionally rigidly and without play to the work arbor 1 via the non-clearance location of the wobble plate 10 and intermediate disc 17. The pivot action of the wobble plate 10 and intermediate disc 17 assure contact of the wobble plate 10 on the entire workpiece circumference, even in case of axial runout of the workpiece end face 29. Wobble plate 10 and intermediate disc 17 are kept loosely together in the non-loaded state by the screws 23, and the cylindrical rollers 13, 18 are secured against axial shift by the grub screws 30, 31.

Figure 3:
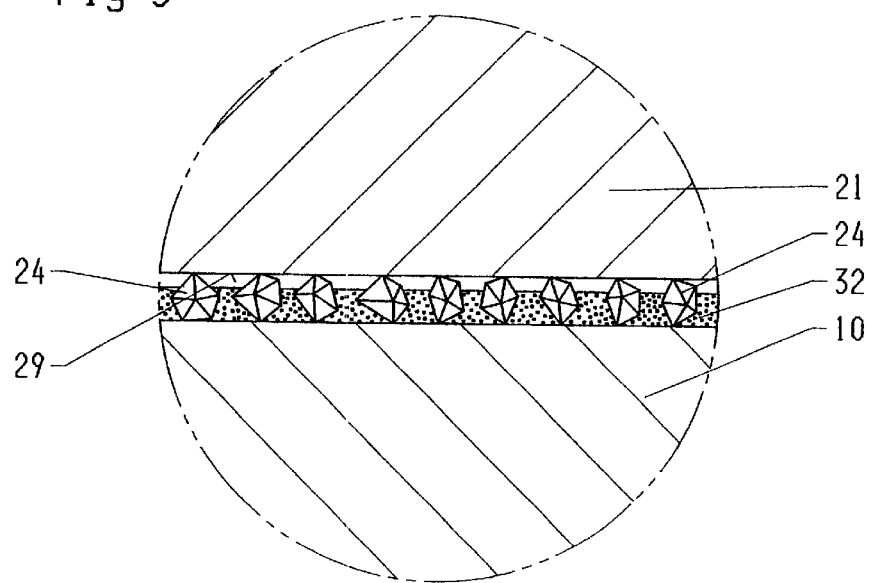
FIG. 3 the detail encircled in FIG. 2, in highly magnified representation.

FIG. 3 shows highly magnified the hard material grains 24 on the upper surface of the wobble plate 10, the points of which protrude from the bond and penetrate under the axial thrust of the tailstock barrel 7 the contacting workpiece end face 29, thereby producing a positive connection between the workpiece 21 and the wobble plate 10. The hard material coating consists of hard material grains 24 of uniform grain size, preferably measuring between 20 mesh and 270 mesh.

Figure 2:
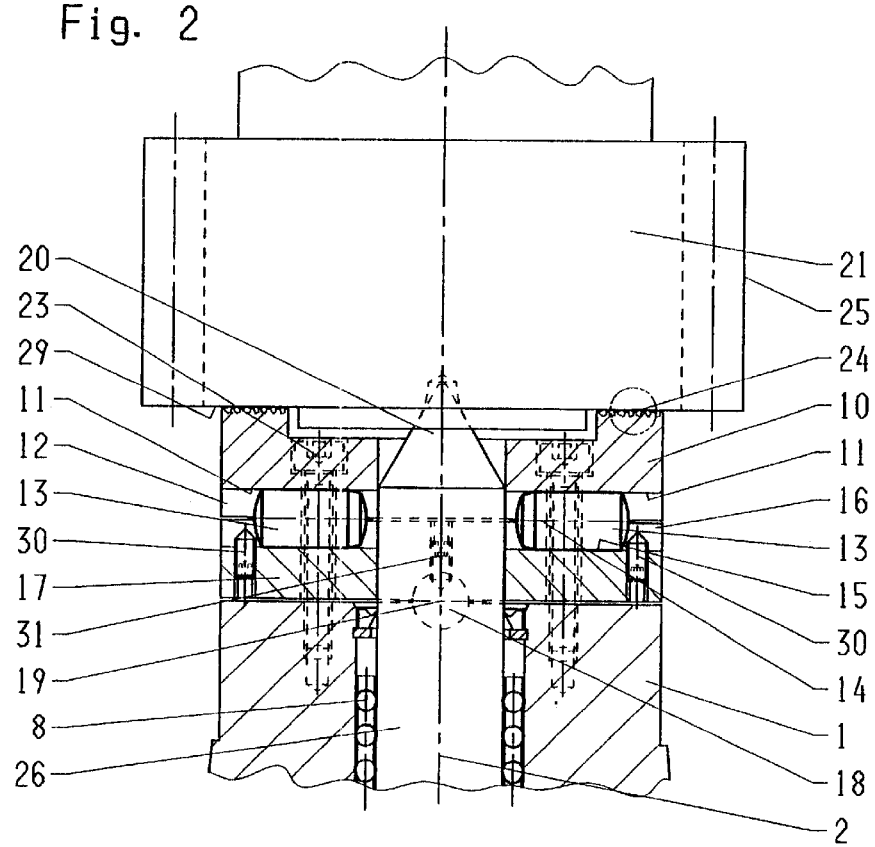
FIG. 2 wobble plate and workpiece, to enlarged scale.
Figure 4:
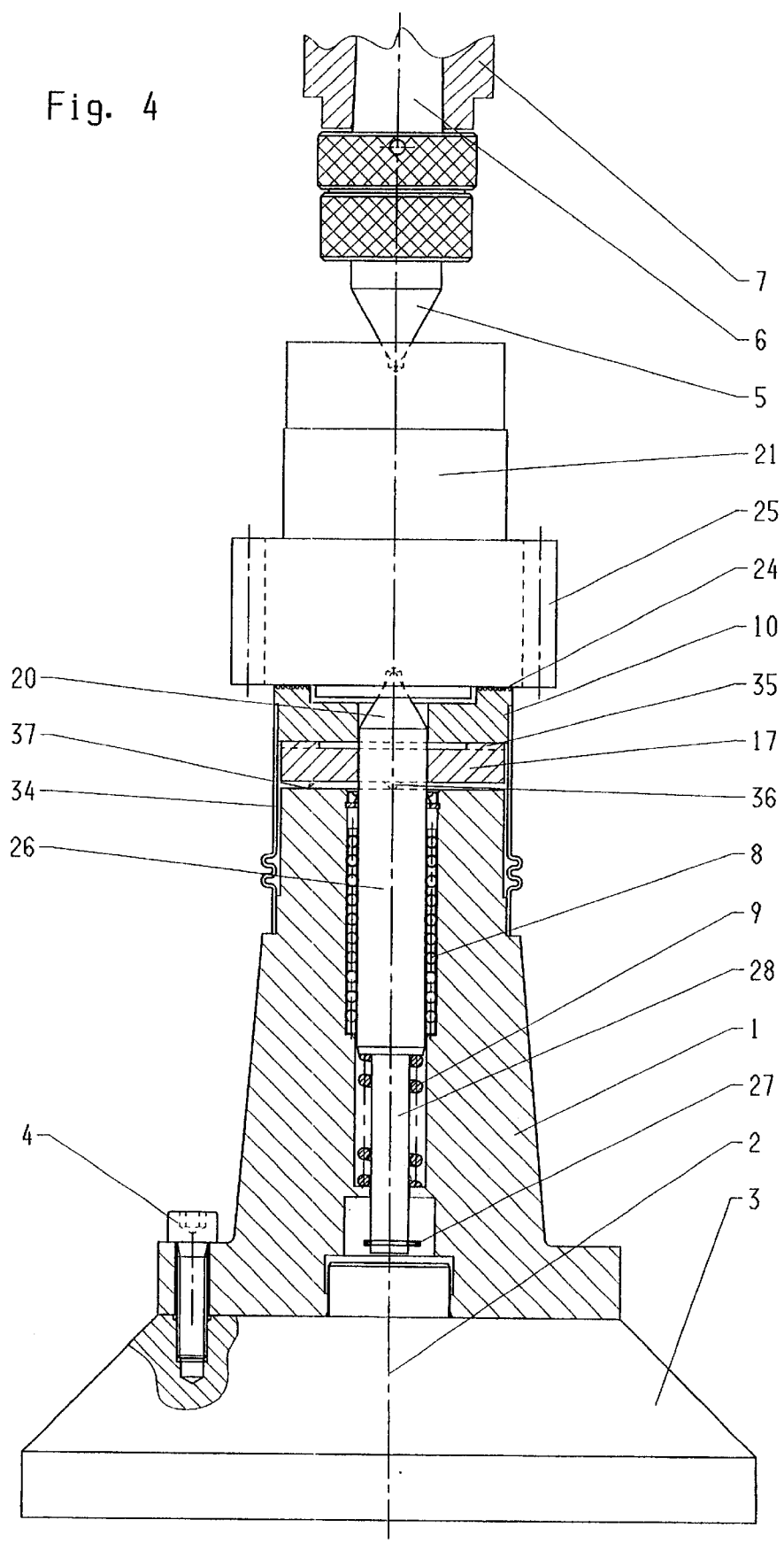
FIG. 4 a variant of the device of FIG. 1 according to the invention.

FIG. 4 shows a design variant of the work fixture depicted in FIG. 1 and FIG. 2 according to the invention, which has the same effect, but has fewer component parts and an effective protection of the contact points of the mutually moving parts against soiling. In this design form of the device the driving torque of the grinding spindle 3 is transmitted from the work arbor 1 to the hard grain 24 coated wobble plate 10 by means of a bendable, axially elastic but torsionally rigid, thin walled metal tube 34, where the tube 34 is firmly connected to the work arbor 1 and wobble plate 10 by, for example, adhesive, soldering, or welding. In this design variant, the flat, hardened underface of the wobble plate 10 seats in the axial direction on the rounded crest of the knife-like radial rib 35 provided on the upper face of the intermediate disc 17. In turn the intermediate disc 17 seats via the rounded crest of the knife-like radial rib 36 provided on its lower face, but offset 90° relative to the rib 35, on the workpiece directed side—in this variant flat—end face 37 of the work arbor 1.

What is claimed is:

1. A device for end face transmission of a driving torque of a work spindle (3) of a machine tool, to a rotating workpiece (21), comprising a work arbor (1) firmly attached to said spindle (3) and a spring loaded work center (26) axially displaceably located therein without play, wherein between said work arbor (1) and said workpiece (21) torsionally and axially rigidly connected without play to said work arbor (1) a wobble plate (10) is arranged, said wobble plate (10) having a surface contacting the workpiece end face (29) and being coated with hard material grains (24) and wherein said wobble plate and said work arbor are torsionally and rigidly connected to one another by means of a pliable, axially elastic thin-walled tube.

2. A device according to claim 1, wherein said wobble plate (10) is pivot located by way of cylindrical steel rollers (13) on an intermediate disc (17), and the latter by way of cylindrical steel rollers (18) offset through 90° on said work arbor (1).

3. A device according to claim 1, wherein said wobble plate (10) is located axially by way of knife-like ribs (35) rounded at a crest on an intermediate disc (17), and the latter by way of knife-like ribs (36) rounded at their crest offset through 90° on said work arbor (1).

4. A device according to claim 1, wherein said hard material grains (29) are galvanically bonded diamond or CBN grains.

5. A device according to claim 1, wherein said hard material grains (24) are of a uniform grain size.

6. A device according to claim 1. wherein said machine tool is a tooth flank grinding machine.

7. A device according to claim 1, wherein said rotating workpiece is a pre-toothed gear component.

8. A device according to claim 1, wherein said hard material grains are of a grain size between 20 mesh and 270 mesh.

* * * * *